United States Patent [19]
Kuriyama et al.

[11] 3,872,367
[45] Mar. 18, 1975

[54] ELECTRIC CAR CONTROLLING DEVICE

[75] Inventors: Sigeru Kuriyama; Hideyuki Hashimoto, both of Katsuta, Japan

[73] Assignee: Hitachi Ltd., Tokyo, Japan

[22] Filed: Aug. 17, 1973

[21] Appl. No.: 389,265

[30] Foreign Application Priority Data
Aug. 28, 1972  Japan.................................. 47-85325

[52] U.S. Cl. ............................................... 318/373
[51] Int. Cl. ..................................... H02p 3/08
[58] Field of Search ............ 318/139, 373, 375, 376

[56] References Cited
UNITED STATES PATENTS

| | | | |
|---|---|---|---|
| 3,344,328 | 9/1967 | Morris | 318/373 X |
| 3,551,769 | 12/1970 | Tedd | 318/373 X |
| 3,710,216 | 1/1973 | Smith | 318/373 |
| 3,777,237 | 12/1973 | Anderson | 318/373 X |

*Primary Examiner*—Robert K. Schaefer
*Assistant Examiner*—W. E. Duncanson, Jr.
*Attorney, Agent, or Firm*—Craig & Antonelli

[57] ABSTRACT

A controlling device for an electric car in which comprises a main closed circuit including a battery, a thyristor chopper circuit and a series-wound electric motor, and means for controlling the commutation rate of the thyristor chopper circuit for control of an output torque from the direct current electric motor wherein said device is provided with a maximum current limiting circuit for detecting a load current of the thyristor chopper circuit and acting on the latter, the limiting circuit having a maximum set value in dependence on an accelerator instruction during plugging.

4 Claims, 4 Drawing Figures

3,872,367

ELECTRIC CAR CONTROLLING DEVICE

BACKGROUND OF THE INVENTION

The present invention relates to an electric car controlling device and, more particularly, to a controlling device for controlling a torque generated when an electric motor for driving an electric car is driven in a plugging mode.

In an electrical car which is driven by an electric motor with a battery serving as a power supply, there is generally provided a plugging braking mechanism. A plugging braking force, determined by a maximum current flowing through the electric motor, has been controlled in conventional controllers to be held at a constant value in dependence on the set value of a current limiting circuit provided for current limitation at normal running. It is, however, preferable to vary the braking force depending on operational conditions from the points of view of improving workability and safety.

SUMMARY OF THE INVENTION

An object of the present invention is to provide an electric car controlling device capable of selectively changing a plugging braking force.

Another object of the present invention is to provide an electric car controlling device capable of selectively changing plugging braking characteristics depending on an operator's wishes.

A further object of the present invention is to provide an electric car controlling device capable of selectively changing a plugging braking force in accordance with operation of an accelerator pedal.

An electric car controlling device according to the present invention is characterized by a semiconductor chopper circuit for turning on and off the connection of an electric motor and a power supply, which is controlled in accordance with the operation of the accelerator pedal and a load current and adaptable to selectively change the plugging current in the case of plugging braking.

DESCRIPTION OF THE PREFERRED EMBODIMENTS

Figure 1:
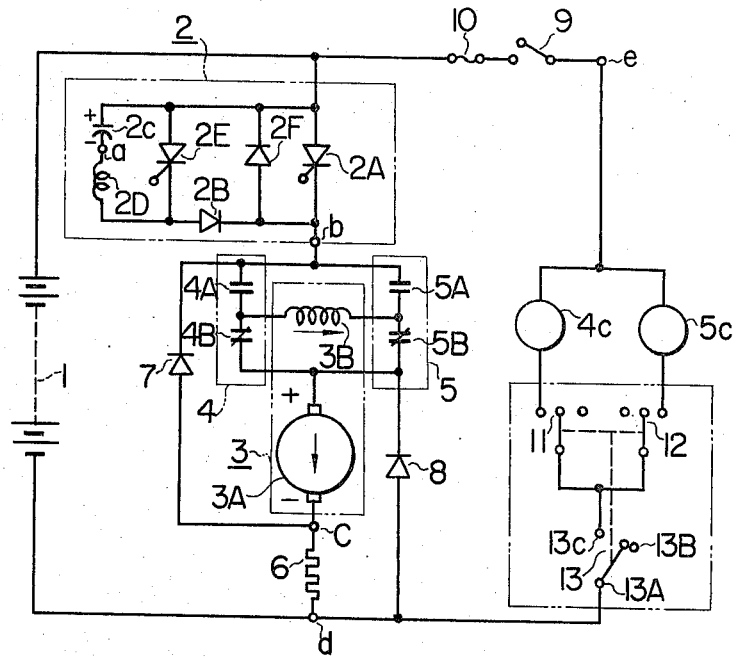
FIG. 1 is an electrical cirCiuit diagram showing a main circuit.
Figure 2:
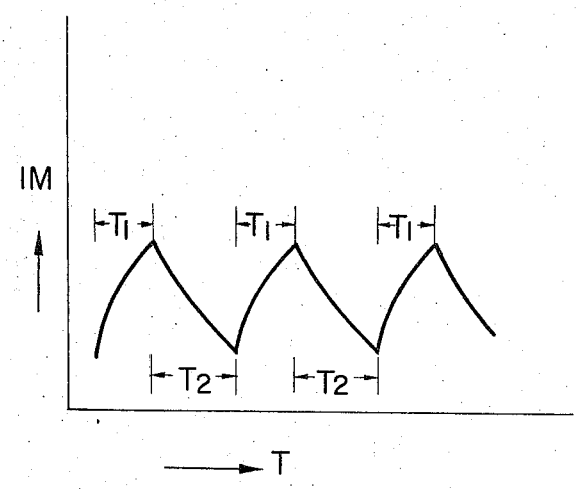
FIG. 2 is a view showing a current waveform.

The present invention will be described in connection with the attached drawings. In FIG. 1 there is shown a closed series circuit comprising a battery 1, a thyristor chopper circuit 2, a series-wound electric motor 3, changing-over switches 4 and 5, and a current detecting resistor 6. The thyristor chopper circuit 2 includes a main thyristor 2A connected in forward polarity in the main circuit, a commutating series circuit having a capacitor 2C and reactor 2D and connected in parallel with the main thyristor 2A through a reverse-current interrupting diode 2B, an auxiliary thyristor 2E connected in parallel with the capacitor 2C and the reactor 2D, and a by-passing diode 2F connected in parallel with the main thyristor 2A in the opposite polarity. A terminal a is led from the connection of the capacitor 2C and reactor 2D. The series-wound electric motor 3 comprises an armature 3A and a field winding 3B which is connected between an output terminal b of the thyristor chopper circuit 2 and the armature 3A and whose polarity is reversible through the switches 4 and 5. The changing-over switch 4 includes a normally open contact 4A and a normally close contact 4B connected in series whose intermediate connecting point is connected to one end of the field winding 3B, while the changing-over switch 5 includes a normally open contact 5A and a normally close contact 5B connected in series whose intermediate connecting point is connected to the other end of the field winding. The contacts 4A and 4B are operated by an electromagnetic winding 4C whereas the contacts 5A and 5B are operated by an electromagnetic winding 5C. A free-wheel diode 7 is connected between the output terminal b of the thyristor chopper circuit 2 and an external terminal c of the armature in the opposite polarity to that of the power source and in parallel therewith. A plugging diode 8 is connected between the internal terminal of the armature and an external terminal d of the current detecting resistor 6 or the negative terminal of the battery 1, in the opposite polarity to that of the power source and in parallel therewith. Both ends of the electromagnetic windings 4C and 5C are connected to a terminal e which is connected to the positive terminal of the battery 1 through a power supply switch 9 and a fuse 10. The other ends of the electromagnetic windings 4C and 5C are connected through an advancing switch 11 and a retreating switch 12, respectively, to the terminal d through a neutral switch 13. Only either switch 11 or 12 is adapted to be closed by operation of a driver. The neutral switch 13 is operatively linked to the switches 11 and 12 and has a movable contact 13A which is connected to a fixed contact 13B when both the switches 11 and 12 are opened and connected to a fixed contact 13C when only one of the switches 11 and 12 is closed.

With such a circuit arrangement, the closing of the power supply switch 9 and the advancing switch 11 causes the electromagnetic winding 4C to be energized thereby closing the normally open contact 4A and opening the normally close contact 4B. At this time, a current flows through a closed circuit extending from the battery 1 through the capacitor 2C, reactor 2D, diode 2B, contact 4A, field winding 3B, contact 5B, armature 3A, and resistor 6 to the battery 1, and the capacitor 2C is charged in the polarity as shown. This charging serves to store commutating energy across the capacitor 2C, so that the changing may be attained by connecting an auxiliary charging resistor between the intermediate connection a and the terminal d. In this state, the firing of the main thyristor 2A causes the thyristor chopper circuit 2 to be rendered conductive to permit current flow through the electric motor 3 in an arrow direction thereby to produce a positive torque on the armature 3A. After the lapse of time of T1, the auxiliary thyristor 2E is fired thereby to cause the electric charge in the capacitor 2C to be released to the reactor 2D and then develop a vibration thereby to charge the capacitor 2C but in polarity opposite to that shown. This voltage establishes a voltage which is opposite in polarity relative to the anode and cathode of both the thyristors 2A and 2E, so that the latter are deactuated to render the thyristor chopper circuit 2 nonconductive. The energy remaining after the deactuation of both the thyristors 2A and 2E is restored to the capacitor 2C to charge it in shown polarity, thus preparing for next firing of the main thyristor 2A, which is again actuated after the lapse of time of T2. The thyristor chopper circuit 2 thus undergoes repetitive conduction and interruption during which its average output voltage $T_1/T_1 + T_2$ times as great as the voltage of the battery is produced. Current 1M flowing through the electric motor 2 during those periods is supplied from the battery 1 in a time region $T_1$ in which the thyristor chopper circuit 2 is kept conductive while being supplied through the diode 7 in the form of a freewheel current in a time region $T_2$ in which the thyristor chopper circuit 2 is in a non-conductive state. The generation of the opposite torque on the armature 3A of the electric motor 3 may be obtained by causing the switch 11 to be open while the switch 12 to be closed to energize the electromagnetic winding 5C thereby to close the normally open contact 5A and to open the normally close contact 5B in order to reverse the current flowing through the field winding 3B.

The plugging braking is effected in such a manner that the switches 11 and 12 are changed-over in the state of forward driving of the electric motor 3 to close the normally open contact 5A and to open the normally close contact 3B thereby to reverse the direction of the current flowing through the field winding 3B. The voltage induced at the armature 3A has a polarity opposite to that shown, and a large plugging current flows through the armature 3 through the diode 8, resulting in the generation of a braking force. The plugging current is detected as a voltage across the resistor 6 and controlled by the driver so as not to be excessive as described hereunder.

Figure 3:
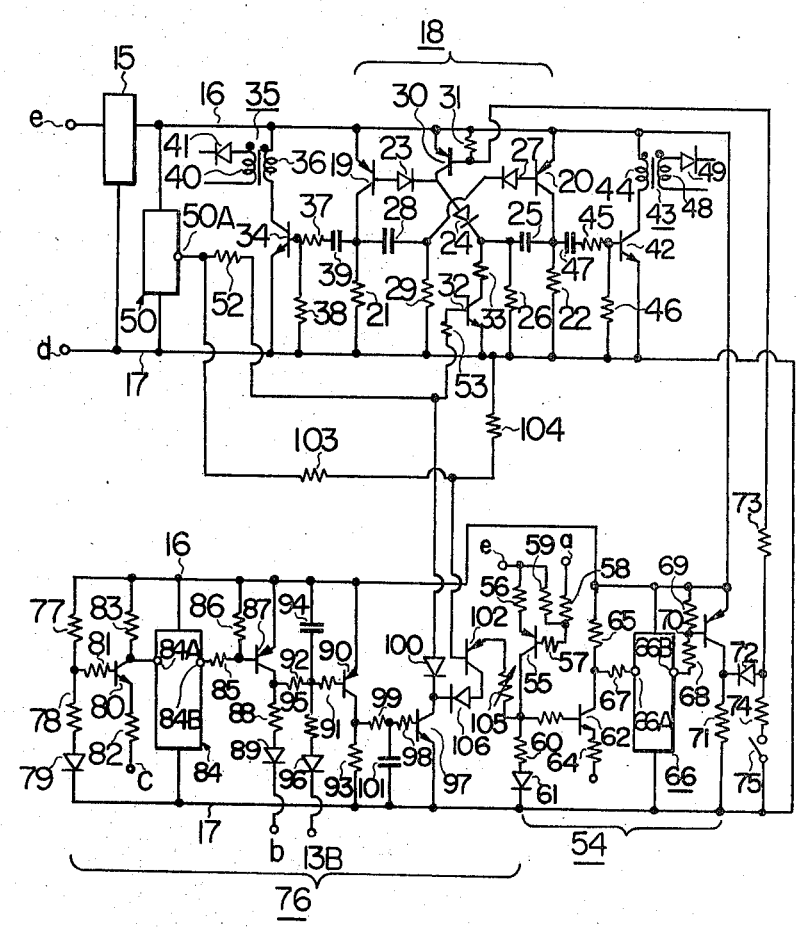
FIGS. 3 and 4 are electrical circuit diagrams showing an auxiliary circuit.

Next, in connection with FIG. 3 description will be made of one embodiment of the arrangement of an auxiliary circuit for effecting such a control. In FIG. 3 there is shown a voltage converting and stabilizing circuit 15 the input terminals of which are connected to the terminals $e$ and $d$ in FIG. 1 and which is adapted to supply power supply lines 16 and 17 with a voltage of 6 or 12 volts convenient for the auxiliary circuit. An astable multivibrator 18 connected between the power supply lines 16 and 17 serves as a trigger pulse supply for alternately firing the main thyristor 2A and auxiliary thyristor 2E in the thyristor chopper circuit 2. PNP transistors 19 and 20 in the astable multivibrator 18 have each emitter connected directly to the power supply line 16 and each collector connected to the power supply line 17 through resistors 21 and 22. The transistor 19 has its base connected to the collector of the transistor 20 through diodes 23, 24 and a capacitor 25, and further connected to the power supply line 17 through these diodes and a capacitor 26.

On the other hand, the transistor 20 has its base connected to the collector of the transistor 19 through a diode 27 and a capacitor 28 and is further connected to the power supply line 17 through the diode 27 and a resistor 29. A transistor 30 of PNP type serves to prevent the oscillation and has its emitter connected to the power supply line 16, its collector connected to an intermediate connection between the diodes 23 and 24, and its base connected to the power supply line 16 through a resistor 31 and to a current limiting circuit, as will be described hereafter. An NPN transistor 32 for controlling the oscillation frequency has its emitter and collector connected in parallel with the resistor 26 through a resistor 33. An NPN power transistor 34 has its emitter connected to the power supply line 17, its collector connected to the power supply line 16 through a primary winding 36 of a pulse transformer 35, and its base connected to the collector of the transistor 19 through voltage dividing resistors 37 and 38 and a differentiating capacitor 39. A secondary winding 40 of the pulse transformer 35 is connected between the gate and cathode of the main thyristor 2A in the thyristor chopper circuit 2 through a diode 41. An NPN power transistor 42 has its emitter connected to the power supply line 17, its collector connected to the power supply line 16 through a secondary winding 44 of a pulse transformer 43, and its base connected to the collector of the transistor 20 through voltage dividing resistors 45 and 46 and a differentiating capacitor 47. A secondary winding 48 of the pulse transformer 43 is connected between the cathode and collector of the auxiliary thyristor 2E in the thyristor chopper circuit 2 through a diode 49. An acceleration instruction circuit 50 has a terminal 50A at which is produced a voltage proportional to a depression of an accelerator pedal and which is connected to the base of the transistor 32 through series-connected resistors 52 and 53. In the acceleration instruction circuit 50 there may be used a potentiometer in cooperation with the accelerator pedal (not shown). A current limiting circuit 54 serves to restrict the current flowing through the thyristor chopper circuit 2 within an allowable maximum. A PNP transistor 55 serves to detect an output voltage across the capacitor 2C in the thyristor chopper circuit 2 to produce an output corresponding to commutation capacity with its emitter connected to the terminal $e$ in FIG. 1 through a resistor 56, its base connected to the capacitor terminal $a$ in the thyristor chopper circuit 2 through resistor 57 and 58 and to the terminal $e$ through the resistors 57 and 58, and its collector connected to the power supply line 17 through a resistor 60 and a temperature compensating diode 61. An NPN converting transistor 52 has its base connected to the collector of the transistor 55 through a resistor 63, its emitter connected to the terminal C of the current detecting resistor 6 through a resistor 64, and its collector connected to the power supply line 17 through a resistor 65. A Schmidt circuit 66 has its input terminal 66A connected to the collector of the transistor 62 through a resistor 67 and its output terminal 66B connected to the power supply line 16 through voltage dividing resistors 68 and 69. The Schmidt circuit 66 is adapted to produce a reduced voltage at the output terminal 66B when an input voltage at the input terminal 66A reaches a predetermined valve. A polarity reversing PNP transistor 70 has its base and emitter with a resistor 69 connected therebetween, and its collector connected to the power supply line 17 through a resistor 71. A cathode of a diode 72 is connected to the collector of the transistor 70, and an anode thereof is connected to the base of the transistor 30 through a resistor 73 and further connected to the power supply line 17 through a resistor 74 and an accelerator switch 75 (closed at the opening of the accelerator pedal). A plugging current limiter 76 is adapted to change the oscillation frequency and the current limiting characteristic of the astable multivibrator in response to its value of current, output voltage from the thyristor chopper circuit, operation of the neutral switch, and an acceleration instruction signal. A series-connected circuit comprising resistors 77 and 78 and a diode 79 establishes a reference voltage generator connected between the power supply lines 16 and 17. A converting NPN transistor 80 has its base connected to the voltage dividing terminal of the reference voltage generator through a resistor 81, its emitter connected to the terminal C of the current detecting resistor 6 through a resistor 82, and its collector connected to the power supply line 16 through a resistor 83. A Schmidt circuit 84 for discriminating current has its input terminal 84A connected to the collector of the transistor 80 and its output terminal 84B connected to the power supply line 16 through voltage dividing resistors 85 and 86. The Schmidt circuit 84 is adapted to produce a reduced voltage at the output terminal 84B when an input voltage to the input terminal 84A reaches a set value. A PNP transistor 87 for reversing polarity has its emitter and base connected across the terminals of a voltage dividing resistor 86 and its collector connected to the output terminal $b$ of the thyristor chopper circuit 2 through a resistor 88 and a reverse-current interrupting diode 89. A synthesizing PNP transistor 90 has its base connected to the collector of the transistor 87 through series-connected resistors 91 and 92, its emitter connected to the power supply line 16, and its collector connected to the power supply line 17 through a resistor 93. An interconnecting point of the resistors 91 and 92 is connected to the power supply line 16 through a capacitor 94 and further connected to the fixed contact 13B of the neutral switch 13 through the series-connected resistor 95 and diode 96. A controlling PNP transistor 97 has its base connected to the collector of the transistor 90 through series-connected resistors 98 and 99, its emitter connected to the power supply line 17 and its collector connected to the interconnection of the resistors 52 and 53 through a diode 100. A capacitor 101 is connected between the interconnection of the resistors 98 and 99 and the power supply line 17 to form a time lag circuit. A PNP transistor 102 for controlling the characteristics of the current limiting circuit 54 has its base connected to voltage dividing resistors 103 and 104 which are in turn connected between the output terminal 50A of the acceleration instruction circuit 50 and the power supply line 17, its emitter connected to the collector of the transistor 55 through a variable resistor 105, and its collector connected to the collector of the transistor 97 through a forward diode 106.

With such an arrangement, the closing of the power supply switch as shown in FIG. 1 causes the power supply lines 16 and 17 to be active.

A description will be made of conducting and cutting-off control modes of the thyristor chopper circuit 2 in a driving state in response to operation of the acceleration pedal.

Firstly, when the accelerator pedal is released, the accelerator switch 75 is closed, so that the forward bias is applied between the emitter and base of the transistor 30 through resistors 73 and 74 to render the emitter and collector circuit conductive. As a result, the astable multivibrator 18 has its transistor 19 rendered nonconductive and its transistor 20 rendered conductive with the oscillation therefrom suppressed, and no trigger pulse is generated from the pulse transformer 35 with the thyristor chopper circuit 2 remaining cut off.

Secondly, the depression of the accelerator pedal to a slight degree results in the initial opening of the accelerator switch 75. When the current flowing through the current detecting resistor 6 does not exceed the predetermined valve, the path between the emitter and collector is in a conductive state with the collector potential being equal to that of the power supply line 16, so that the base potential of the transistor 30 connected to the astable multivibrator 18 is made equal to the emitter potential with the result of the cut off state between the emitter and collector. This causes the astable multivibrator 18 to be prepared for oscillation with the transistor 19 first rendered conductive thereby to make conductive the emitter and collector circuit of the transistor 34 due to the current flowing from the capacitor 39 in the collector circuit through the resistor 37 to the base emitter circuit of the transistor 34. The collector current of the transistor 34 is transformed by the pulse transformer 35 to fire the main thyristor 2A in the thyristor chopper circuit 2, thus rendering the latter conductive. A conduction period $T_1$ of the transistor 19 is determined by a time-constant defined by the capacitor 28 and the resistor 29, and the voltage between the power supply lines. After the lapse of time of $T_1$, the transistor 19 is cut off and the transistor 20 is rendered conductive whereupon the current flows through the circuit defined by the capacitor 47, resistor 45, and base-emitter circuit of the transistor 42 with the base-emitter circuit thereof rendered conductive. The collector current of the transistor 42 is transformed by the pulse transformer 43 to fire the auxiliary thyristor 2E in the thyristor chopper circuit 2, thus rendering the latter non-conductive. A conduction period $T_2$ of the transistor 20 is determined by the voltage between the power supply lines and the time constant due to the capacitor 25 and the resultant resistance from the resistors 26 and 33 and internal resistance along the path between the emitter and collector of the transistor 32 with the transistor 20 cut off and the transistor 19 rendered conductive after the lapse of time of $T_2$. At the state of the slight depression of the accelerator pedal, low potential appears at the output terminal 50A of the acceleration instruction circuit 50 and great internal resistance is formed between the emitter and collector of the transistor 32 consequently with the long period of time of $T_2$. As mentioned earlier, the thyristor chopper circuit 2 produces the averaged output voltage $T_1/T_1 + T_2$ times as great as the battery voltage with the result of the low output state of the electric motor 3 at this state.

Thirdly, the greater depression of the accelerator pedal causes the voltage at the output terminal of the acceleration instruction circuit 50 to be elevated and the internal resistance between the emitter and collector of the transistor 32 to be reduced with the result of the shortened period of $T_2$, the increased average output voltage from the thyristor chopper circuit, and the high output state of the electric motor 3.

Next, the operation of the current limiting circuit 54 in a driving state will be described. The current flows through the current limiting resistance 6 in the driving state during the period of time of $T_1$ in which the thyristor chopper circuit 2 is kept conductive. As a result, no current flows through the resistor 88 in the plugging current controller 76, and the transistors 90, 97 and 102 are in the cut-off state because the fixed contact 13B of the neutral switch 13 is open, so that the transistors 32 and 62 are not subject to the influence of the plugging current controller 76. In the time region of $T_1$ during which the thyristor chopper circuit 2 is kept conductive, the current causes the voltage drop across the current detecting resistor 6 with a voltage developing at the terminal C. The polarity of the voltage is opposite to the emitter of the transistor 62, and, with its level increased, the internal resistance between the emitter and collector is increased with the elevated collector potential. The elevation of the collector potential to the set potential of the Schmidt circuit 66 causes the latter to be operated to increase the output at the terminal B with the base current of the transistor 70 cut off. This causes the emitter and collector circuit of the transistor 70 to lead to the cut off state with the lowered collector potential, thus permitting the base current of the transistor 30 to flow through the diode 72 and the resistor 71. When the base current flows to render conductive the emitter and collector circuit of the transistor 30, the transistor 19 in the astable multivibrator 18 is cut off to make the transistor 20 conductive and to cut off the thyristor chopper circuit 2 as mentioned earlier. The cutting off of the thyristor chopper circuit 2 results in the abrupt reduction of the current flowing through the current detecting resistor 6, thus restoring the current limiting circuit 54.

The operational value of the current limiting circuit 54 is determined as follows. The voltage at the terminals a and e of FIG. 1 is applied between the emitter and base of the transistor 55 to produce the collector potential corresponding to the terminal voltage across the commutating capacitor 2C due to the fact that the maximum allowable current depends primarily on the commutation capability of the thyristor chopper circuit 2. The application of the reference voltage to the base of the converting transistor 62 causes the collector potential to provide the commutation capability in terms of the current, thereby preventing the excessive current from flowing in response to the set value of the Schmidt circuit 66.

In the control operation of the plugging brake driving, the switch 12 as shown in FIG. 1 is closed immediately after the switch 11 is opened in order to transfer the forward drive to the reverse drive (actually forwards against the plugging brake torque). During the process, the movable contact 13A of the neutral switch 13 comes into temporary contact with the fixed contact 13B, so that the current flows along the emitter-base circuit of the transistor 90 from the resistor 91 through the resistor 95 and diode 96 to the fixed contact 13B. This causes the transistors 90 and 97 to be rendered conductive at the circuit between their emitter and collector, which further causes the base circuit of the transistor 32 to be short-circuited to lengthen the conduction period T₂ of the transistor 20 in the astable multivibrator 18 and to reduce the output voltage from the thyristor chopper circuit 2. At the same time, the transistor 102 has its collector connected to the power supply line 17 through the diode 106 and the transistor, and its emitter supplied with current proportional to the base current to alter the base potential of the converting transistor 62. The base current is inversely proportional to the voltage at the output terminal of the accelerator instructed circuit 50A, so that the base potential of the converting transistor 62 increases proportionally to the depression of the accelerator pedal with the result that the operational current of the current limiting circuit 54 increases in proportion to the depression of the accelerator.

When the switch 12 is closed to supply the electromagnetic winding 5C with current for closing of the normally open contact 5B and opening of the normally close contact 5B, the field winding 3B has its polarity reversed to produce a negative torque at the armature 3A and produce an induced voltage in polarity opposite to that shown. The conduction of the thyristor chopper circuit 2 causes the current from the battery 1 to flow through the closed circuit extending from the thyristor chopper circuit 2 through the normally open contact 5A, field winding 3B, normally closed contact 4B, armature 3A and current detecting resistor 6 to the battery 1.

The induced voltage at the armature is, on the other hand, in forward polarity relative to the plugging diode 8, and the current detecting resistor 6 has a small value. These facts lead to the result that a plugging current flows through the closed circuit defined from the armature 3A through the current detecting resistor 6 and the diode 8 to the armature 3A. The current 1M is converted to the terminal voltage of the current detecting resistor 6 for detection in the current limiting circuit 54, and then causes the thyristor chopper circuit 2 to be cut off in a similar manner as mentioned earlier when the current reaches a level corresponding to the output voltage from the acceleration instruction circuit 50. The induced voltage at the armature 3A, however, has the forward polarity relative to the free-wheel diode 7, so that the field winding 3B is self-energized by the closed circuit extending from the armature 3A through the diode 7, normally open contact 5A, field winding 3B and normally close contact 4B back to the armature 3A with the plugging current gradually reduced. The reduction in plugging current causes the voltage at the terminal of the current detecting resistor 6 to be reduced with the collector potential of the transistor 62 also reduced. As a result, the reduced voltage reaches a restoring level of the Schmidt circuit 66 whereupon the potential at the output terminal 66B is reduced to render the transistor 70 conductive with its collector potential elevated. This causes the transistor 30 to be cut off and the transistor 19 in the astable multivibrator 18 to be conductive with the result of the conduction of the thyristor chopper circuit 2.

On the other hand, the voltage at the terminal of the current detecting resistor 6 is applied to the emitter of the converting transistor 80 in the plugging current controller 76. If the level of the voltage is above the predetermined valve, then the Schmidt circuit 84 has high potential at the output terminal 84B, rendering the emitter-collector circuit of the transistor 87 non-conductive. The cutting off of the thyristor chopper circuit 2 permits the potential at the output terminal b to be reduced, so that the plugging current control is effected in a state where the base current flows through the resistors 91, 92 and 88 and the diode 89 with the transistors 90 and 97 held conductive. When the plugging current falls below the predetermined value, the Schmidt circuit 84 is restored to cut off the transistor 87 for suspension against the plugging current control. It is to be noted that in the plugging current control the control relative to the depression of the accelerator pedal is effected to the variable resistor 105 connected to the emitter circuit of the transistor 102.

Figure 4:
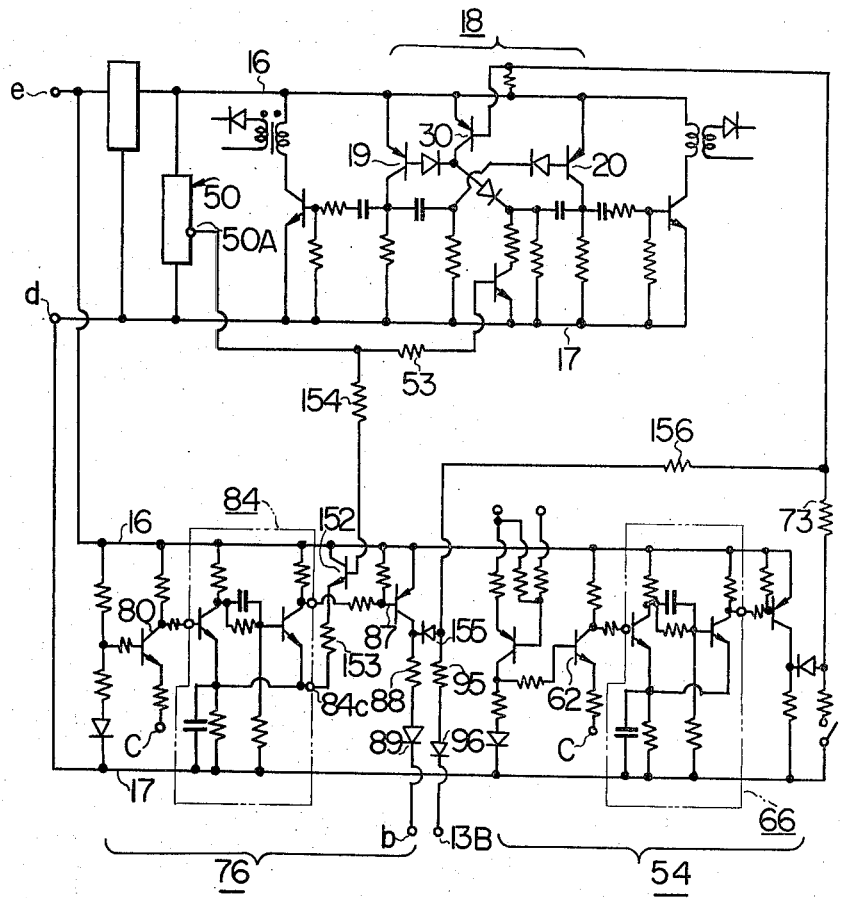

An auxiliary circuit shown in FIG. 4 is adapted to apply output signals of the plugging current controller 76 directly to the astable multivibrator 18. If the current limiting circuit 54 is designed for convenience to the running drive control, there occurs sometimes an inconvenience to the plugging current control. The plugging current controller 76, when additionally mounted on conventional devices, is preferably constituted so as to effect current control independently of the current controller at the driving. In this embodiment, the plugging current controller 76 is disposed independently of other circuits. The detailed description of portions common with those of FIG. 3 will be omitted. A common emitter terminal 84C of NPN transistors 150, 151 of the Schmidt circuit 84 in the plugging current controller 76 is introduced to control operational values. An NPN transistor 152 for controlling the operational values has its collector connected to the power supply line 16, its emitter connected to the terminal 84C through a resistor 153 and its base connected to the output terminal 50A of the acceleration instruction circuit 50 through a resistor 154. The collector of the transistor 87 is connected to the output terminal b of the thyristor chopper circuit, to the fixed contact 13B of the neutral switch 13 through a diode 155 and further to the base of the transistor 30 in the astable multivibrator through the diode 155 and the resistor 156. The maximum of the plugging current is restricted by the operational value of the current limiting circuit 54 while the minimum thereof is restricted by the restoring value of the Schmidt circuit 84 in the plugging current controller 76 varying with the depression of the accelerator pedal. That is, the hysteresis characteristic of the Schmidt 66 in the current limiting circuit 54 is made small to elevate the restoring value in order to control the restoring value of the Schmidt circuit 84 in the plugging current controller 76 for control of the firing of the thyristor chopper circuit 2.

In operation, in a conductive state of the thyristor chopper circuit 2 the terminal b of the plugging current controller 76 is of as high potential as in the previous embodiment, and no base current can flow through the transistor 30 in the astable multivibrator 18. The operation of the current limiting circuit 54 allows the base current of the transistor 30 to flow, thus rendering the latter conductive to cut off the thyristor chopper circuit 2. The cutting off of the thyristor chopper circuit 2 leads to the reduction of the plugging current whereupon the current limiting circuit 54 is restored. The base current of the transistor 30 is retained by the plugging current collector 76 to provide a delay to the conduction of the thyristor chopper circuit 2.

Firstly, in the case of the slight depression of the accelerator pedal, the Schmidt circuit 84 is not restored until the plugging current becomes considerably small because of the low current flowing from the output terminal 50A of the acceleration instruction circuit 50 through the resistor 154 to the base of the transistor 152, the low current flowing from the emitter through the resistor 153 to the terminal 84C, and the reduced potential at the terminal C. The restoration of the Schmidt circuit 84 due to the plugging current causes the transistors 151 and 87 to be rendered conductive and the collector potential of the transistor 87 to be substantially equal to the potential of the power supply line 16 thereby to cut off the base current of the transistor 30. This causes the emitter-collector circuit of the transistor 30 to be cut off and the astable multivibrator 18 to be again oscillated with the result of the small average of the plugging current and the low plugging braking force during this period.

Secondly, in the greater depression of the accelerator pedal a larger base current flows through the transistor 152 to elevate the potential at the terminal 84C of the Schmidt circuit because of the high voltage at the output terminal 50A of the acceleration instruction circuit 50. Accordingly, the thyristor chopper circuit 2 is stribed in the state of considerably large plugging current due to the accelerated restoration with the result of the increased average current and increased plugging braking force during this period.

A still further embodiment may be conceived in which the Schmidt circuit 66 of the current limiting circuit 54 has the operational values, restoring values and hysteristic width varied in dependence on the depression of the accelerator pedal.

As mentioned above, the present invention provides effective improvement on markability and safty because the plugging braking force can be controlled depending on an operator's will.

We claim:

1. An electric car controlling device comprising a series-connected circuit including a direct current power supply, a semiconductor chopper circuit, a direct current electric motor circuit including a field circuit and an armature circuit of a direct current electric motor and means for changing over the polarity of said armature in said direct current electric motor relative to that of said field thereof, and a current detecting circuit; a plugging diode circuit including said current detecting circuit and arranged in opposite polarity relative to a power supply voltage for providing a parallel circuit to said armature; and circuit means for controlling the conduction and cutting off of said semiconductor chopper circuit, said circuit means including a current controller for acting on said semiconductor chopper circuit so as to confine current within a predetermined region in dependence on the current detected by said current detecting circuit, and a plugging current control circuit responsive to the output of said chopper circuit and the output current of said current detecting circuit for changing said predetermined region upon detecting the state of plugging, said plugging current control circuit including circuit means for amplifying the output current of said current detecting circuit.

2. An electric car controlling device as set forth in claim 1, wherein said predetermined region in said current controller varies with an instruction from an accelerator in said plugging state.

3. An electric car controlling device as set forth in claim 1, wherein said circuit means for controlling the conduction and cutting off of said semi-conductor chopper circuit comprises an oscillating circuit for instructing the conduction and cutting off of said semiconductor chopper circuit in response to the instruction from the accelerator, a maximum current limiting circuit acting on said oscillating circuit and operative to cut off said semiconductor chopper circuit upon detection of a predetermined maximum current by said current detecting circuit, a minimum current limiting circuit acting on said oscillating circuit to prevent said semiconductor chopper circuit from being rendered conductive until said current detecting circuit detects a minimum current in dependence on the instruction from the accelerator, said plugging current control circuit for rendering said minimum current limiting circuit active only upon detection of the plugging state of said direct current electric motor.

4. An electric car controlling device as set forth in claim 1, further comprising a free-wheel diode whose anode is connected to the junction between said current detecting circuit and said direct current motor circuit and whose cathode is connected to the junction between said chopper circuit and said direct current motor circuit.

* * * * *